Oct. 2, 1956 W. C. SPEED ET AL 2,765,126

TAPE SUPPLY DEVICE

Filed Dec. 21, 1950 2 Sheets-Sheet 1

INVENTOR
William C. Speed
James J. Dwyer
BY
Pennie, Edmonds, Morton & Barrows
ATTORNEYS INVENTOR
William C. Speed
James J. Dwyer
BY
Pennie, Edmonds, Morton & Barrows
ATTORNEYS

United States Patent Office 2,765,126

Patented Oct. 2, 1956

2,765,126

TAPE SUPPLY DEVICE

William C. Speed, Riverside, and James J. Dwyer, Stamford, Conn., assignors to Audio Devices, Inc., New York, N. Y., a corporation of New York Application December 21, 1950, Serial No. 201,976

3 Claims. (Cl. 242—75)

This invention relates to the production of magnetic recording tape and has for its object certain improvements in the method of and apparatus for charging tape base to a coating stage of the operation.

This application contains subject matter disclosed in copending applications, Serial No. 201,974 and Serial No. 201,975, now Patent No. 2,700,367, filed simultaneously herewith. In accordance with the disclosures of those applications, the tape base is passed successively through a tape base charging zone, where it is carefully unwound from its roll; a pre-coating zone, where its upper surface is treated with a liquid adhesive material; a pre-coat drying zone, where some of the solvent is removed from the adhesive coating; a magnetic coating zone, where a coating of magnetic material, such as oxide of iron, is applied to the adhesive coating; a series of drying zones; a magnetic coating monitoring zone; a tape base aligning zone; a discharge zone, etc. The tape base may or may not be passed through the pre-coating and pre-coat drying zones. The subject matter of this application is confined to the improvements relating to the charging of the tape base to one or the other coating operation.

In accordance with the invention, a roll of the tape base is placed and maintained in alignment with its predetermined path of travel. The tape base is moved from the roll to a coating at a predetermined linear speed. The tension and rate of rotation of the roll are controlled so that the tape base is unwound no faster than is required for that linear rate of speed. This is advantageously accomplished by applying a controlled amount of braking action to the roll. The tape base is subjected to varying amounts of tension transversely to take out curl already present and to inhibit curling. The moving tape base is gripped transversely before reaching the coating zone to place the portion of the tape base extending back to the roll under suitable tension.

Figures 1, 2, 3, 4:
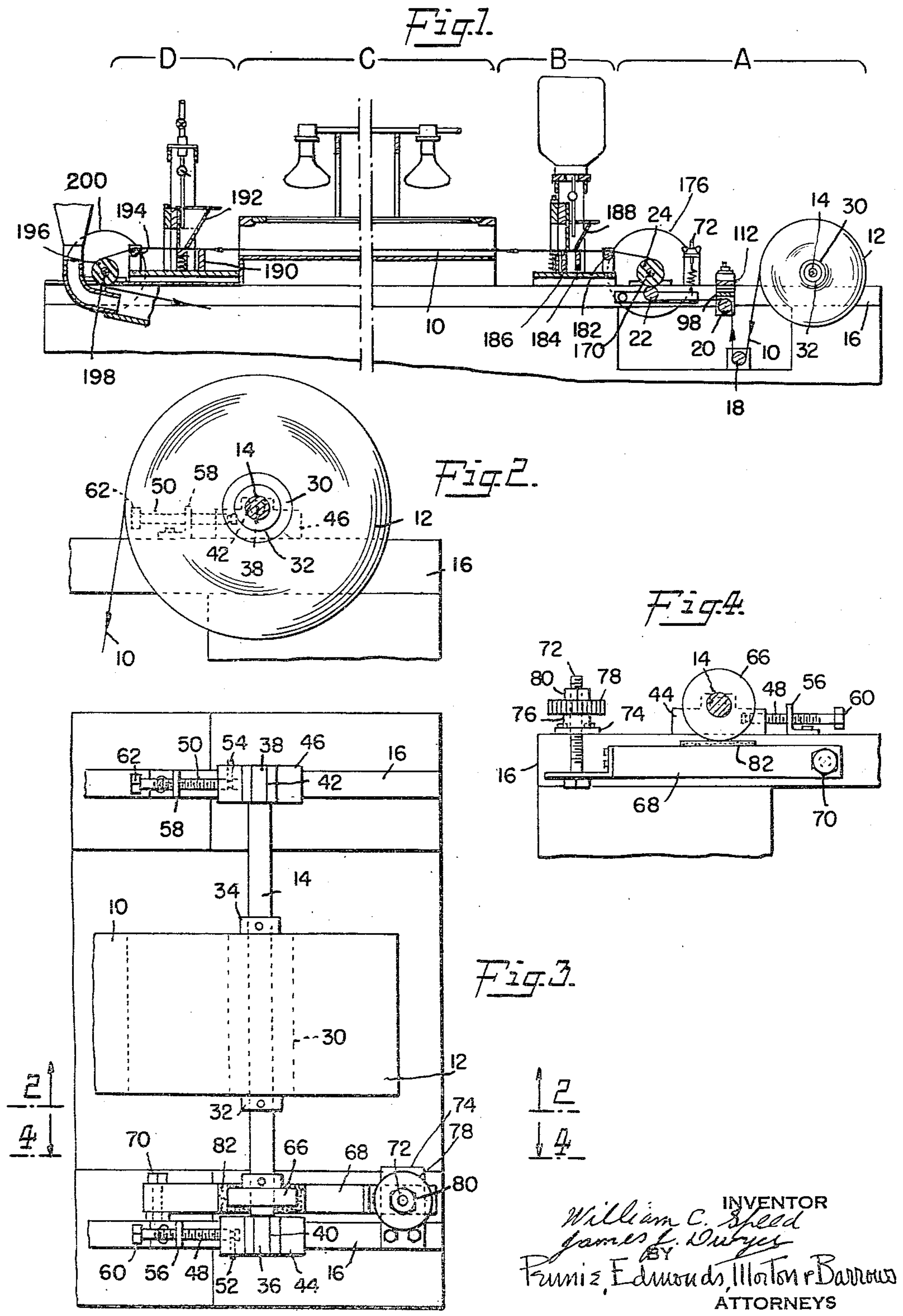
Figure 5:
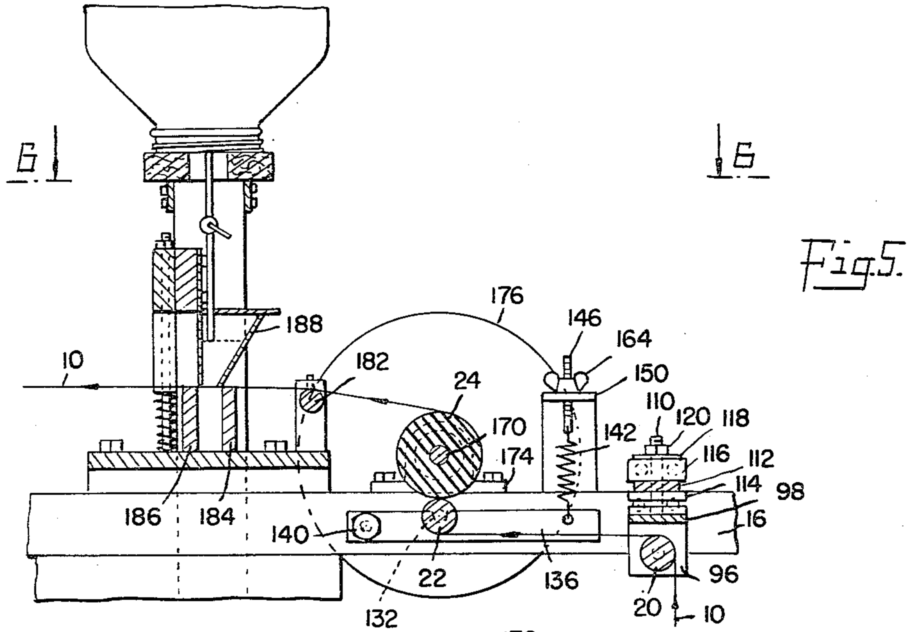
Figure 6:
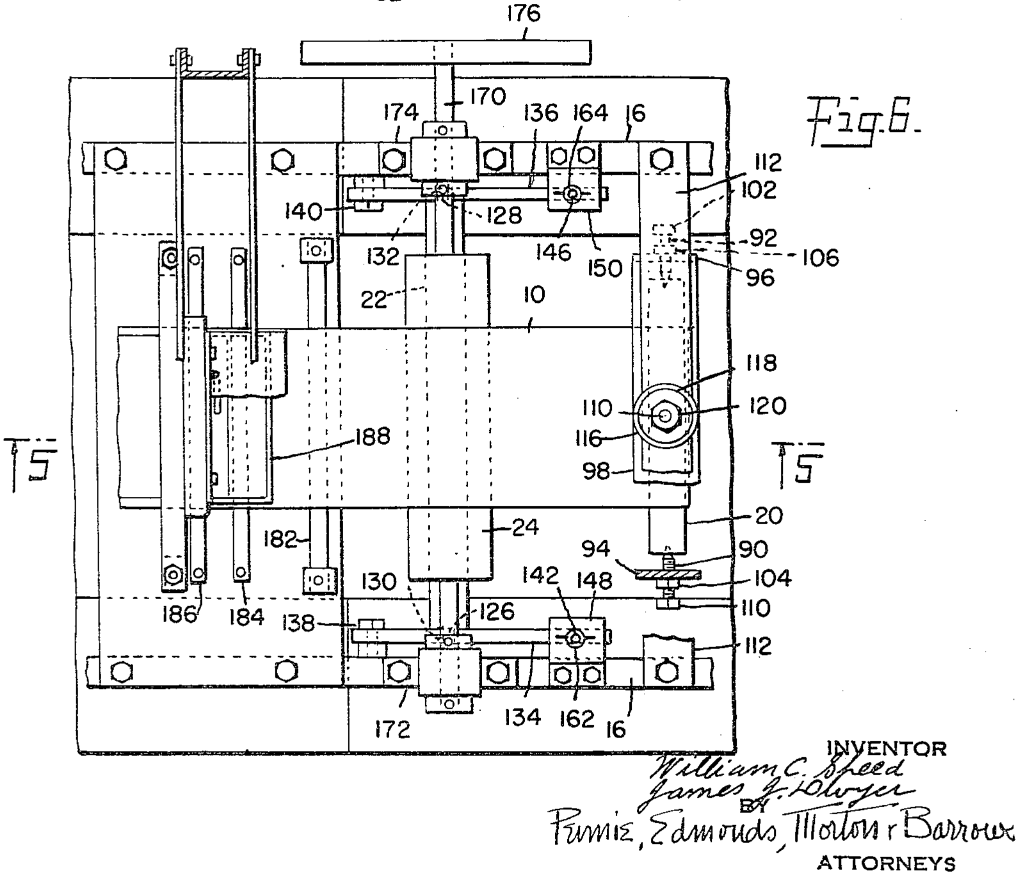

These and other features of the invention will be better understood by referring to the accompanying drawings, taken in conjunction with the following description, in which:

Fig. 1 is a longitudinal sectional elevation of a form of tape base charging or feeding apparatus illustrative of a practice of the invention;

Figs. 2, 3 and 4 are enlarged views of Fig. 3 being a plan view and Figs. 2 and 4 being sectional views on the lines 2—2 and 4—4, respectively of Fig. 3; and Figs. 5 and 6 are enlarged views also of portions of the tape base charging apparatus, Fig. 5 being a sectional view on the line 5—5 of Fig. 6 and Fig. 6 a sectional elevation on the line 6—6 of Fig. 5.

Referring first to Fig. 1, the apparatus shown is divided into: a tape base charging zone A; an adhesive pre-coating zone B; a pre-coat drying zone C; and a magnetic coating zone D. A tape base 10 of any suitable material, such as paper, cellulose acetate, etc., in the form of a roll 12, is mounted on a shaft 14 supported by a frame 16. The tape base extends around rollers 18, 20, 22 and 24 which are suitably supported by the frame.

The position of shaft 14, and hence of roll 12, as more particularly shown in Figs. 2, 3 and 4, is adjustable, so that the tape base may be unwound from the roll and advanced for pre-coating in an optimum manner. As it comes from the manufacturer, the roll of tape is fitted with a hub 30 having a central hole adapted to receive the shaft. Collars 32 and 34, fit on the shaft. They are provided with set screws so that the roll may be placed and maintained in its optimum position for unrolling.

The shaft is provided with bearing ends 36 and 38 of smaller diameter adapted to fit into bearing slots 40 and 42 of slidable bearings 44 and 46 resting flatly on the opposite sides of the frame. The non-threaded inner ends of adjusting screws 48 and 50 fit into the far ends of the bearings, the ends of the screws being held within the bearings by lock pins 52 and 54 extending laterally into the end walls of the bearings and into annular grooves in the end portions of the screws. Due to this construction the screws may turn freely within the walls of the bearings without being pulled therefrom.

A pair of supports 56 and 58, each with a threaded hole, is integrally secured to the tops of the side members of the frame. Since the threaded portions of the screws fit into the threaded holes of the supports, heads 60 and 62 of the screws may be turned suitably to move the bearings forwardly or rearwardly. One screw may be turned more than the other in order also to alter the transverse angle of spindle 64 with respect to the direction of travel of the tape base.

In order to keep the rate of unwinding of the tape base from the roll under control, special braking means are provided. They comprise a brake-disc 66 integrally secured to and near one end of the spindle. A brake-arm 68 is pivotally secured at one end to the frame by means of a pivoting member 70. The other end of the brake-arm is freely supported by an adjusting bolt 72 in turn supported by a bracket 74 secured to the frame. A washer 76 and a hand wheel 78 are disposed between the bracket and a nut 80. A brake-block or band 82 is secured to the top of the brake arm, directly below brake-disc 66. As more particularly shown in Fig. 4, the hand wheel may be turned in the appropriate direction to raise or lower the brake-arm and hence to increase or decrease the braking action between the brake-disc and the brake-block, and thereby to control the speed of rotation of the spindle and the roll.

Roller 20 is specially suspended and supported (Figs. 5 and 6) to inhibit tendencies of the tape base to curl and to help compensate for curl present initially in the tape base, as well as to align the tape base in its path of travel to the pre-coating zone. As more clearly shown in Fig. 6, the roller is suspended at its centrally recessed ends by means of threaded lateral pivot members 90 and 92 extending through and supported by depending arms 94 and 96 of a yoke 98. The position of the pivot members with respect to the roller may be adusted and maintained by turning their heads 100 and 102 and lock nuts 104 and 106. The yoke is in turn suspended midway between its ends by a pivot bolt 110 extending upwardly through a cross-support 112 secured at its ends to the frame. To assume easy pivoting of the roller, and hence of its yoke laterally of the tape base, a roller-bearing assembly 114 (Fig. 5) is provided between the top of the yoke and the bottom of the cross-support; and another roller-bearing assembly 116 is provided between the top of the cross-support and washer 118 under nut 120. The roller is thus able automatically to adjust itself to the right or left, in the direction of travel of the tape base, about its midpoint in response to planar variations in the tape base as it passes over the roller.

Roller 22 is provided at its ends (Fig. 6) with bearing shoulders 126 and 128 of smaller diameter, which fit in journal slots 130 and 132 in the top intermediate portion of pivoting arms 134 and 136 pivotally secured at their far ends to the frame by means of securing members 138 and 140. The near ends of the pivot arms are each suspended (Fig. 5) from the lower ends of springs 142, secured at their upper ends (Fig. 6) to bolts 144 and 146 extending through Z-shaped brackets 148 and 150 fastened to the frame. Wing nuts 162 and 164 may be used to adjust the tension of the springs to regulate and maintain the upward thrust of the roller toward roller 24, and hence to regulate and maintain the amount of grip of the rollers on the tape base as it passes between them.

Roller 24 is advantageously formed of rubber to ensure a better grip on the tape base. The roller is mounted on a shaft 170 extending transversely across the top of the frame and fitting in journals 172 and 174 secured to the frame. The far end of the shaft is fitted with a flywheel 176 to help keep the tape base under uniform tension as it passes into the precoating operation.

Since the improvements of this divisional application are concerned primarily with the charging or feeding of the tape base to a coating zone, the tape base need only be traced through adhesive pre-coating zone B, pre-coat drying zone C, and magnetic coating zone D, all of which are described in some detail in the copending applications referred to. The tape base (Fig. 5) passes over a laterally disposed guide rod 182, which is located at a somewhat higher level than roller 24; over a pair of parallel supports 184 and 186, under an adhesive feed hopper 188, at a still higher level; over a guide support 190, in advance of a magnetic feed hopper 192; over a guide support 194 in back of the magnetic feed hopper; and around a roller 196 below the level of the latter guide support. The latter roller is made preferably of such material as rubber so that it may grip the underside of the coated tape base. The roller is tightly mounted on a spindle 198 mounted in the journals. A flywheel 200 fits on the far end of the spindle. Roller 196 with its flywheel and roller 24 with its flywheel (Fig. 1) keep the tape base under tension and uniform speed, thus helping to assure optimum coating conditions during the tape base charging or feeding operation.

It will be clear to those skilled in this art that the above is only by way of example and that the practice of the invention readily lends itself to a number of useful modifications.

We claim:

1. In apparatus for producing magnetic sound recording and sound reproducing tape in which a tape base charging device is placed in advance of a magnetic coating machine; the improvement comprising a spindle mounted in a pair of journals adapted to support a roll of tape base, means for adjusting the spindle for placing the roll of tape base supported thereon in alignment with its predetermined path of travel to the coating machine, a pivoted guide roller positioned transversely across the path of travel of the advancing tape base in advance of the coating machine for adjusting automatically the support of the tape base in response to transverse variations of the tape base from a predetermined path of travel to guide and confine the tape base thereto, brake means for controlling the rate of rotation of the roll of tape base supported on the spindle so that the tape base is unwound therefrom no faster than is required to maintain it at a predetermined optimum linear speed and tension as it moves to the coating machine, a pair of juxtaposed rollers extending transversely of said predetermined path of travel of the tape base and positioned to have the tape base pass between them, one of said rollers being mounted on a fixed axis and the other on a movable axis, and means for adjusting the axis of the latter roller relative to the fixed roller to regulate the gripping pressure between the rollers to control the tension applied to the tape base being pulled from a roll mounted on the spindle.

2. In apparatus as set forth in claim 1, the further improvement in which the movable of the pair of juxtaposed rollers is resiliently urged towards the fixed roller.

3. In apparatus as set forth in claim 1, the further improvement in which at least one of the journals for the spindle is adjustable forwardly and backwardly relative to said path of travel of the tape base.

References Cited in the file of this patent

UNITED STATES PATENTS

| | | |
|---|---|---|
| 163,207 | Kellberg | May 11, 1875 |
| 212,767 | Tucker | Feb. 25, 1879 |
| 221,462 | Hoe | Nov. 11, 1879 |
| 1,686,488 | Foster | Oct. 2, 1928 |
| 1,958,692 | Besal et al. | May 15, 1934 |
| 2,296,753 | Wilton | Sept. 22, 1952 |
| 2,599,390 | Huse | June 3, 1952 |

FOREIGN PATENTS

| | | |
|---|---|---|
| 489,395 | Germany | Jan. 17, 1930 |